UNITED STATES PATENT OFFICE.

EASTER M. HUGHES AND CHARLES C. HUGHES, OF HIGHLAND PARK, ILLINOIS.

POLISHING COMPOUND.

967,777. Specification of Letters Patent. Patented Aug. 16, 1910.

No Drawing. Application filed July 26, 1909. Serial No. 509,655.

*To all whom it may concern:*

Be it known that we, EASTER M. HUGHES and CHARLES C. HUGHES, citizens of the United States, residing at Highland Park, county of Lake, and State of Illinois, have invented certain new and useful Improvements in Polishing Compounds, of which the following is a specification.

Our invention relates to a compound for polishing and preserving metal, hard wood, leather, and hard surfaces, and has for its object the production of such a compound which will give a high and lasting polish.

Our invention consists in the compound, hereinafter described and claimed.

The compound consists of 1 qt. of paraffin oil, 1 pt. of turpentine, ½ pt. of alcohol, and ½ pt. of cider vinegar. These ingredients are thoroughly mixed together and applied in the usual manner. The compound should be well shaken before using. This compound will be found to give a high and lasting polish to all hard surfaces.

We are aware that all the separate ingredients of this polish have been used before in various compositions and make no claim to their use separately. However, we have found that conjoint use of all of these ingredients, especially in the proportions specified, produce a high and lasting polish not capable of production by their separate use, or by their use with other ingredients.

We have set forth the preferred proportions of ingredients to be used in making this compound, these may be varied to some extent and good results obtained. We therefore do not wish to be limited to the exact proportion of ingredients set forth but wish to avail ourselves of such variations as come within the scope of the appended claims.

Having described our invention what we claim as new and desire to secure by Letters Patent is:

1. A polishing compound, consisting of paraffin oil, turpentine, alcohol, and cider vinegar, substantially as described.

2. A polishing compound, consisting of one quart of paraffin oil, one pint of turpentine, one-half pint of alcohol and one-half pint of cider vinegar, substantially as described.

In testimony whereof we have signed our names to this specification in the presence of two subscribing witnesses.

EASTER M. HUGHES.
CHARLES C. HUGHES.

Witnesses:
HELEN F. LILLIS,
JOSHUA R. H. POTTS.